(12) United States Patent
Fukuda

(10) Patent No.: US 9,319,538 B2
(45) Date of Patent: Apr. 19, 2016

(54) MANAGEMENT APPARATUS, IMAGE PROCESSING APPARATUS AND IMAGE PROCESSING SYSTEM

(75) Inventor: Yoshio Fukuda, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 241 days.

(21) Appl. No.: 13/047,054

(22) Filed: Mar. 14, 2011

(65) Prior Publication Data

US 2011/0222098 A1     Sep. 15, 2011

(30) Foreign Application Priority Data

Mar. 15, 2010  (JP) ................................. 2010-057353

(51) Int. Cl.
| | |
|---|---|
| *G06K 15/00* | (2006.01) |
| *H04N 1/00* | (2006.01) |
| *G06F 3/12* | (2006.01) |
| *G06F 11/07* | (2006.01) |
| *G06F 11/32* | (2006.01) |

(52) U.S. Cl.
CPC ............ *H04N 1/00344* (2013.01); *G06F 3/126* (2013.01); *G06F 3/1213* (2013.01); *G06F 3/1217* (2013.01); *G06F 3/1234* (2013.01); *G06F 3/1288* (2013.01); *G06F 11/0733* (2013.01); *G06F 11/0793* (2013.01); *G06F 11/327* (2013.01); *H04N 1/00323* (2013.01); *G06F 2206/1506* (2013.01); *G06F 2206/1508* (2013.01)

(58) Field of Classification Search
CPC . G06F 11/0733; G06F 11/0793; G06F 1/327; G06F 2206/1506; G06F 2206/1508; G06F 3/1213; G06F 3/1217; G06F 3/1234; G06F 3/126; G06F 3/1288; H04N 1/00323; H04N 1/00344

USPC .................. 358/296, 1.15; 709/225
See application file for complete search history.

(56) References Cited

U.S. PATENT DOCUMENTS

| | | | | |
|---|---|---|---|---|
| 5,287,194 | A  * | 2/1994 | Lobiondo | ..................... 358/296 |
| 6,856,416 | B1 * | 2/2005 | Danknick | ............. G06F 3/1204 358/1.14 |
| 2009/0204710 | A1* | 8/2009 | Wada | .................. G06F 21/6218 709/225 |
| 2010/0182643 | A1* | 7/2010 | Ito | ............................... 358/1.15 |

FOREIGN PATENT DOCUMENTS

| | | |
|---|---|---|
| JP | 8-336002 A | 12/1996 |
| JP | 2002-254781 A | 9/2002 |
| JP | 2005-265932 A | 9/2005 |

\* cited by examiner

*Primary Examiner* — Tammy Pham
*Assistant Examiner* — Bharatkumar Shah
(74) *Attorney, Agent, or Firm* — Birch, Stewart, Kolasch & Birch, LLP

(57) ABSTRACT

A first image forming apparatus detects a malfunction generated in a functional unit thereof and determines a functional mode that cannot be executed. The first image forming apparatus transmits the functional mode that cannot be executed to a management apparatus. When obtaining the functional mode that cannot be executed, the management apparatus updates a functional mode table. The management apparatus increases a priority of the first image forming apparatus for a functional mode that the first image forming apparatus can execute. Along with this, the management apparatus decreases a priority of a second image forming apparatus that normally operates for the functional mode that the first image forming apparatus can execute. When receiving a job, the management apparatus refers to the updated functional mode table to allocate the job to one of the image forming apparatuses.

6 Claims, 10 Drawing Sheets

| STATE | SCAN | COPY | PRINT | FAX RECEPTION | FAX TRANSMISSION |
|---|---|---|---|---|---|
| MALFUNCTION GENERATED IN DISPLAY UNIT | × | × | ○ | ○ | × |
| MALFUNCTION GENERATED IN IMAGE READING UNIT | × | × | ○ | ○ | × |
| MALFUNCTION GENERATED IN SHEET CONVEYANCE UNIT | ○ | × | × | △ | ○ |
| MALFUNCTION GENERATED IN IMAGE FORMATION UNIT | ○ | × | × | △ | ○ |
| MALFUNCTION GENERATED IN FAX COMMUNICATION UNIT | ○ | ○ | ○ | × | × |

FIG.3

| STATE | SCAN | COPY | PRINT | FAX RECEPTION | FAX TRANSMISSION |
|---|---|---|---|---|---|
| MALFUNCTION GENERATED IN DISPLAY UNIT | × | × | ○ | ○ | × |
| MALFUNCTION GENERATED IN IMAGE READING UNIT | × | × | ○ | ○ | × |
| MALFUNCTION GENERATED IN SHEET CONVEYANCE UNIT | ○ | × | × | △ | ○ |
| MALFUNCTION GENERATED IN IMAGE FORMATION UNIT | ○ | × | × | △ | ○ |
| MALFUNCTION GENERATED IN FAX COMMUNICATION UNIT | ○ | ○ | ○ | × | × |

FIG.4A

| APPARATUS NAME | STATE | SCAN | COPY | PRINT | FAX RECEPTION | FAX TRANSMISSION |
|---|---|---|---|---|---|---|
| APPARATUS 1A | NORMAL | ○ | ○ | ○ | ○ | ○ |
| APPARATUS 1B | NORMAL | ○ | ○ | ○ | ○ | ○ |
| APPARATUS 1C | NORMAL | ○ | ○ | ○ | ○ | ○ |

FIG.4B

| APPARATUS NAME | STATE | SCAN | COPY | PRINT | FAX RECEPTION | FAX TRANSMISSION |
|---|---|---|---|---|---|---|
| APPARATUS 1A | MALFUNCTION GENERATED IN IMAGE READING UNIT | × | × | ◎ | ◎ (RECEPTION) | × |
| APPARATUS 1B | NORMAL | ○ | ○ | △ | △ (TRANSMISSION) | ○ |
| APPARATUS 1C | NORMAL | ○ | ○ | △ | △ (TRANSMISSION) | ○ |

FIG.10

| MODE | STATE | SCAN | COPY | PRINT | FAX RECEPTION | FAX TRANSMISSION |
|---|---|---|---|---|---|---|
| (A) | MALFUNCTION IN DISPLAY UNIT | × | × | ◎ | ◎ (RECEPTION) | × |
| (A) | NORMAL | ○ | ○ | △ | △ (TRANSMISSION) | ○ |
| (B) | MALFUNCTION IN SHEET CONVEYANCE UNIT | ○ | × | × | △ (TRANSMISSION) | ○ |
| (B) | NORMAL | ※ | ○ | ○ | ◎ (RECEPTION) | ※ |
| (B') | MALFUNCTION IN SHEET CONVEYANCE UNIT | ○ | × | × | △ (TRANSMISSION) | ○ |
| (B') | NORMAL | ○ | ○ | ○ | ◎ (RECEPTION) | ○ |
| (C) | MALFUNCTION IN IMAGE FORMATION UNIT | ○ | × | × | △ (TRANSMISSION) | ○ |
| (C) | NORMAL | ※ | ○ | ○ | ◎ (RECEPTION) | ※ |
| (C') | MALFUNCTION IN IMAGE FORMATION UNIT | ○ | × | × | △ (TRANSMISSION) | ○ |
| (C') | NORMAL | ○ | ○ | ○ | ◎ (RECEPTION) | ○ |
| (D) | MALFUNCTION IN FAX COMMUNICATION UNIT | ○ | ○ | ◎ | × | × |
| (D) | NORMAL | ※ | ※ | △ | ○ | ○ |
| (D') | MALFUNCTION IN FAX COMMUNICATION UNIT | ○ | ○ | ○ | × | × |
| (D') | NORMAL | ○ | ○ | ○ | ○ | ○ |

MANAGEMENT APPARATUS, IMAGE PROCESSING APPARATUS AND IMAGE PROCESSING SYSTEM

CROSS REFERENCE

This Nonprovisional application claims priority under 35 U.S.C. §119(a) on Patent Application No. 2010-057353 filed in Japan on Mar. 15, 2010, the entire contents of which are hereby incorporated by reference.

BACKGROUND OF THE INVENTION

The present invention relates to an image processing apparatus that, when a part of functional units thereof generates a malfunction, effectively uses another functional unit free from a malfunction, and relates to an image processing system including the imaging processing apparatus and a server apparatus.

Conventionally, various methods have been proposed for utilizing an image forming apparatus effectively by connecting a plurality of image forming apparatuses via a network. In such an environment with a plurality of image forming apparatuses connected via a network, when a malfunction occurs in one of the image forming apparatuses, a job will concentrate on another image forming apparatus free from malfunctions (hereinafter called a normally operating image forming apparatus), so that such a normally operating image forming apparatus will be overloaded. Japanese Unexamined Patent Application Publication No. 2005-265932 describes an image forming apparatus that, when a malfunction occurs in an image forming unit, disables image forming functions using the image forming unit only, while enabling functions not using the image forming unit such as a scan function and a fax function.

In the image forming apparatus described in Japanese Unexamined Patent Application Publication No. 2005-265932, however, a normally operating image forming apparatus is used for the disabled image forming functions, and therefore jobs concerning image forming functions will concentrate on such an image forming apparatus, and the normally operating image forming apparatus will be overloaded. Therefore, waiting time in the normally operating image forming apparatus will be increased between accepting of a request for execution for a job and executing of the job.

Thus, it is an object of the present invention to provide a management apparatus, an image processing apparatus and an image processing system capable of reducing a load and waiting time for a job in a normally operating image forming apparatus so as to improve user's convenience.

SUMMARY OF THE INVENTION

A management apparatus of the present invention is connected to a plurality of image processing apparatuses and to at least one information processing apparatus. Image processing apparatuses include a copier, a multifunction machine and a facsimile, for example, and execute a job relating to image processing. The image processing apparatuses can execute jobs in a plurality of functional modes. The plurality of functional modes include a scan mode to read an image on a document, a copy mode to copy a document, a print mode to print image data externally input, a fax reception mode to receive fax and a fax transmission mode to transmit fax, for example. The information processing apparatus is a so-called personal computer that issues a request for execution of a job to the management apparatus.

The management apparatus includes storage means and allocation means. The storage means stores a functional mode table that stores a relationship between the plurality of functional modes and a generation state of malfunctions in the image processing apparatuses to which jobs are allocated. The allocation means refers to the functional mode table, and when a functional mode of a job accepted from the information processing apparatus agrees with an executable functional mode of an image processing apparatus with a malfunction occurring in a part of functional units thereof (hereinafter called a defective image processing apparatus), the allocation means allocates the job to the defective image processing apparatus.

With this configuration, when receiving a request for execution of a job from the information processing apparatus, the management apparatus preferentially allocates a job in an executable functional mode to the defective image processing apparatus by referring to the functional mode table.

Preferably, the management apparatus further includes reception means and update means. In this case, the functional mode table stores a relationship between the plurality of functional modes and priorities of the image processing apparatuses for allocation of a job. The reception means receives a generation state of malfunctions from the image processing apparatuses. Based on the generation state of malfunctions, the update means increases a priority of an image processing apparatus with less executable functional modes for allocation of jobs corresponding to the executable functional modes.

With this configuration, when the image processing apparatuses are equipped with different functional modes, the management apparatus allocates a job preferentially to an image processing apparatus with less executable functional modes. For instance, the management apparatus allocates a job in a print mode preferentially to a printer than to a multifunctional machine, and allocates a job in a fax reception mode or in a fax transmission mode preferentially to a facsimile than to a multifunctional machine. Thusly, jobs can be concentrated on an image processing apparatus that is executable in a single functional mode only, whereby the management apparatus can reduce a load on an image processing apparatus that is executable in a plurality of functional modes.

The management apparatus may notify the information processing apparatus that issues the request for execution of a job about an image processing apparatus to which the job is allocated. Thereby, a user can identify the image processing apparatus executing the job.

An image processing apparatus of the present invention executes jobs corresponding to a plurality of functional modes relating to image processing. The image processing apparatus includes a plurality of functional units, detection means and notification means. Each of the plurality of functional units operates with execution of at least one of the plurality of functional modes. The detection means detects the presence or not of a malfunction for each of the plurality of functional units. The notification means notifies the management apparatus about a generation state of malfunctions based on a detection result by the detection means. When a malfunction occurs in an image processing apparatus, a job in an executable mode is allocated preferentially to the image processing apparatus by the management apparatus.

With this configuration, when a malfunction occurs in a part of functional units of an image processing apparatus, a job in an executable mode is preferentially allocated to the image processing apparatus. Such a defective image processing apparatus accepts a job in a concentrated manner, whereby a load on a normally operating image processing apparatus can be reduced. As a result, waiting time for a job in the normally operating image processing apparatus can be reduced, and user's convenience can be improved.

Based on a detection result by the detection means, the image processing apparatus may display a functional mode that cannot be executed among the plurality of functional modes. With this configuration, the image processing apparatus can notify a user of a functional mode that cannot be executed.

An image processing system of the present invention includes the above-described management apparatus and image processing apparatuses and information processing apparatus. The management apparatus may be provided in one of the image processing apparatuses.

The management apparatus, the image processing apparatus and the image processing system can reduce waiting time for a job, and can improve user's convenience.

BRIEF DESCRIPTION OF THE DRAWINGS

FIG. 3 exemplifies a correspondence table between functional modes and functional units.

FIG. 4A exemplifies a functional mode table when image forming apparatuses 1A to 1C operate normally.

FIG. 4B exemplifies a functional mode table when a malfunction occurs in the image reading unit of the image forming apparatus 1A.

FIG. 10 exemplifies another functional mode table.

DETAILED DESCRIPTION OF THE INVENTION

The following describes a management apparatus, an image processing apparatus and an image processing system according to embodiments of the present invention, with reference to the drawings.

Figure 1:
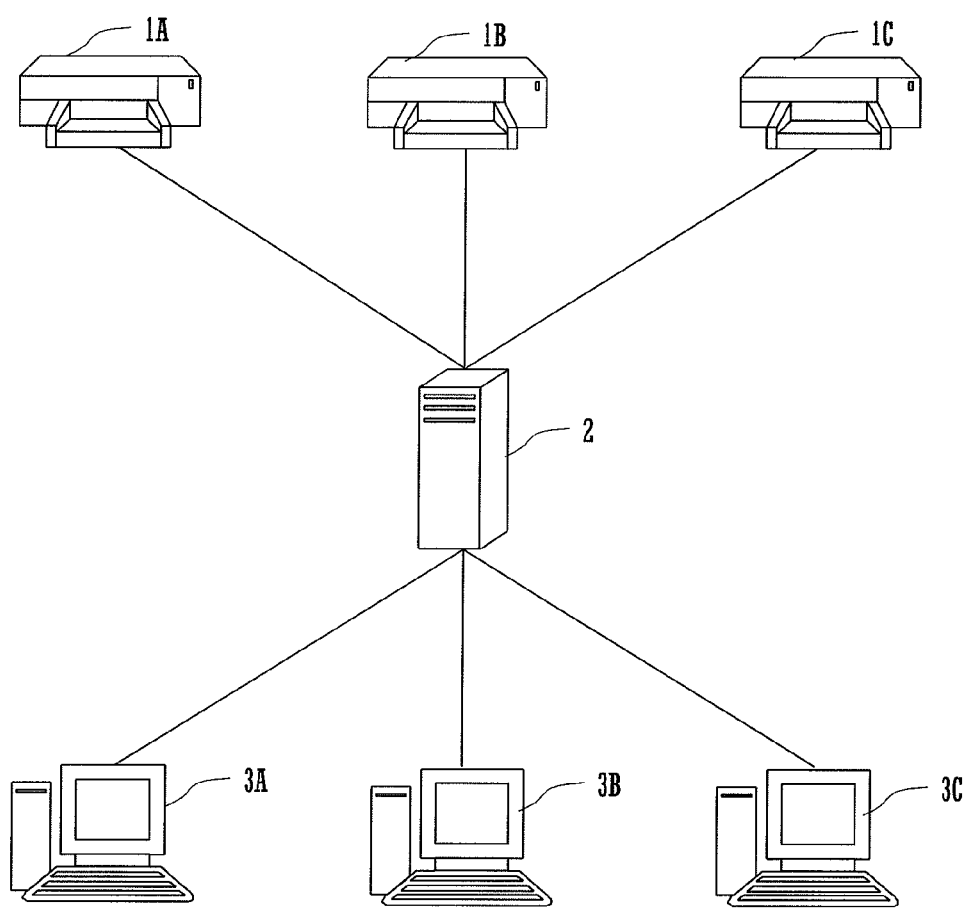
FIG. 1 illustrates the configuration of an image processing system.

As illustrated in FIG. 1, the image processing system includes one management apparatus 2, at least one or more personal computers (hereinafter called a PC, corresponding to an information processing apparatus of the present invention) 3A to 3C and a plurality of image forming apparatuses 1A to 1C. The management apparatus 2 is connected to the PCs 3A to 3C and to the image forming apparatuses 1A to 1C via a network. The management apparatus 2 accepts a request for execution of a job relating to image processing from a any one of PCs 3A to 3C, and allocates the job to one of the image forming apparatuses 1A to 1C.

The image forming apparatuses 1A to 1C (corresponding to image processing apparatuses of the present invention) are so-called multifunctional machines, and can execute jobs in a plurality of functional modes relating to image processing.

The functional modes include a scan mode to read an image on a document, a copy mode to copy a document, a print mode to print image data transmitted from the PCs 3A to 3C, a fax reception mode to receive fax, and a fax transmission mode to transmit fax, for example.

Figure 2:
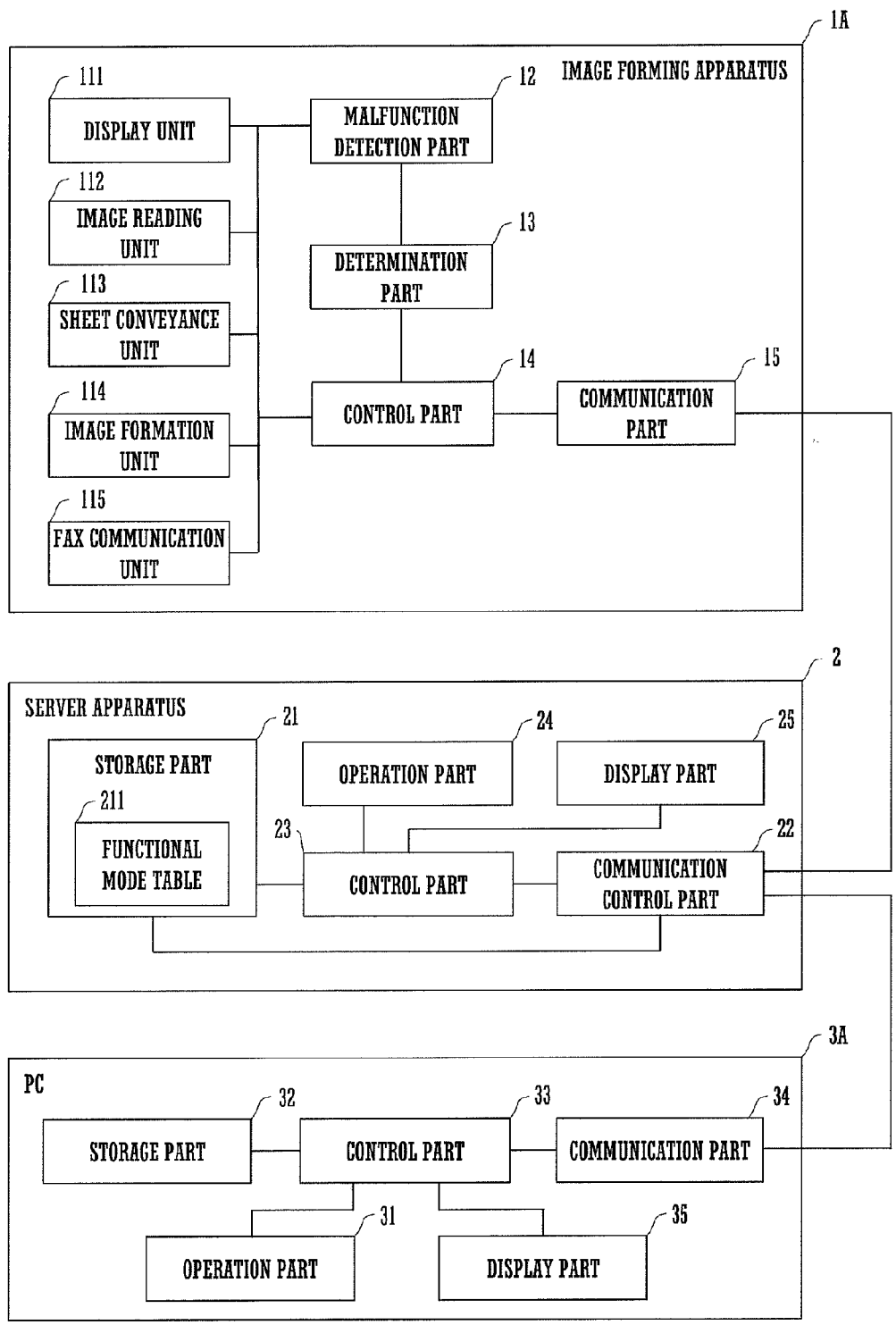
FIG. 2 is a block diagram of a management apparatus, an image forming apparatus and an information processing apparatus configuring an image processing system.

As illustrated in FIG. 2, the PC 3A includes an operation part 31, a storage part 32, a control part 33, a communication part 34 and a display part 35. The PCs 3B and 3C have the same configuration as that of the PC 3A.

The storage part 32 stores programs implementing various applications and various data input through the operation part 31 and the communication part 34. The operation part 31 is a so-called keyboard or mouse, accepting an operation and an input by a user. For instance, the operation part 31 accepts an operation and an input for image and document print processing, and outputs an operation instruction signal to the control part 33.

In accordance with the operation instruction signal from the operation part 31, the control part 33 executes programs of various applications in the storage part 32, and transmits a request for execution of a job in a print mode to the management apparatus 2 via the communication part 34. The control part 33 further controls the display part 35 to display data received from the management apparatus 2 via the communication part 34, and the storage part 32 to store the data.

The management apparatus 2 includes a storage part 21, a communication control part (corresponding to allocation means of the present invention) 22, a control part (corresponding to update means of the present invention) 23, an operation part 24 and a display part 25.

The storage part 21 stores a functional mode table 211 illustrated in FIG. 4A and FIG. 4B. The functional mode table 211 stores the association between a generation state of malfunctions in the functional units of the image forming apparatuses 1A to 1C, a plurality of functional modes and priorities of the image forming apparatuses 1A to 1C.

The communication control part 22 controls transmission/reception of data with respect to the image forming apparatuses 1A to 1C and the PCs 3A to 3C. The communication control part 22 receives a generation state of malfunctions from the image forming apparatuses 1A to 1C, and outputs the generation state to the control part 23. The communication control part 22 receives jobs from the PCs 3A to 3C, allocates the jobs to the image forming apparatuses 1A to 1C by referring to the functional mode table 211, and transmits the jobs to the image forming apparatuses 1A to 1C.

The control part 23 controls the functional parts in accordance with an operation instruction signal from the operation part 24. The control part 23 further updates the functional mode table 211 based on the generation state of malfunctions input from the communication control part 22.

The operation part 24 is a so-called keyboard or mouse, accepting an operation and an input by a user. For instance, the operation part 24 accepts an operation and an input by a user to instruct start and end of the management apparatus 2, and outputs an operation instruction signal to the control part 23. The display part 25 is a so-called monitor, displaying data output from the control part 23.

The image forming apparatus 1A includes various functional units, a malfunction detection part 12, a determination part 13, a control part 14 and a communication part 15. The image forming apparatuses 1B and 10 have the same configuration as that of the image forming apparatus 1A.

The functional units include a display unit 111, an image reading unit 112, a sheet conveyance unit 113, an image formation unit 114 and a fax communication unit 115. The display unit 111 is a so-called display panel, accepting an operation and an input to the image forming apparatus 1A and displaying various types of information. The image reading unit 112 is a so-called scanner, reading an image on a document to generate image data. The image reading unit 112 typically includes an optical reduction system sensor including a light source, a mirror, a CCD and a lens. The sheet conveyance unit 113 conveys a sheet from a sheet storage part storing sheets to transfer an image thereon, and outputs the sheet to a sheet output part via the image formation unit 114. The image formation unit 114 forms an image based on image data on a sheet conveyed by the sheet conveyance unit 113. The fax communication unit 115 is connected to a telephone work, implementing fax reception and fax transmission. Note here that the functional units in the image forming apparatuses 1 are just one example, and are not a limiting one.

The malfunction detection part 12 detects a malfunction generated in each functional unit. When detecting a malfunction, the malfunction detection part 12 outputs the malfunction detected to the determination part 13. For instance, the image reading unit 112 corrects a gray level so that output values from the CCD are 0 for black and 255 for white. For black correction, the image reading unit 112 switches off the light source, and reads a blackboard provided on a document platen by the CCD. At this time, when the light source does not turn off or an output value from the CCD exceeds a threshold value (a value around 0), the malfunction detection part 12 detects a malfunction in the image reading unit 112.

The determination part 13 stores a correspondence table between the functional modes and the functional units illustrated in FIG. 3. This correspondence table indicates whether each functional mode can be executed or not when a malfunction occurs in each functional unit. The determination part 13 refers to the correspondence table to make a determination based on a defective functional unit as to whether each functional mode can be executed or not.

The control part 14 controls the functional parts to make the display unit 111 display the determination result as a generation state of malfunctions and transmit the determination result to the management apparatus 2 via the communication part 15.

Referring next to FIGS. 3 to 7B, the flow of processing by the image forming apparatus 1A when detecting a malfunction in the image reading unit 112 and the management apparatus 2 is described below.

Let that the determination part 13 in each of the image forming apparatuses 1A to 1C stores the correspondence table between functional modes and functional units illustrated in FIG. 3. In FIG. 3, a circle denotes a functional mode that can be executed, a cross denotes a functional mode that cannot be executed, and a triangle denotes a functional mode, the execution of which can be accepted. For example, a triangle indicates the case of a fax reception mode when a malfunction occurs in the sheet conveyance unit 113, where a fax can be accepted but data received cannot be printed.

Let that the management apparatus 2 stores in the storage part 21 the functional mode table 211 (see FIG. 4A) when the image forming apparatuses 1A to 1C operate normally. In FIG. 4A and FIG. 4B, a cross denotes a functional mode that cannot be executed and a circle denotes a functional mode to be executed with a normal priority. A double circle denotes a functional mode to be executed with an increased priority, and a triangle denotes a functional mode to be executed with a decreased priority.

Figure 5:
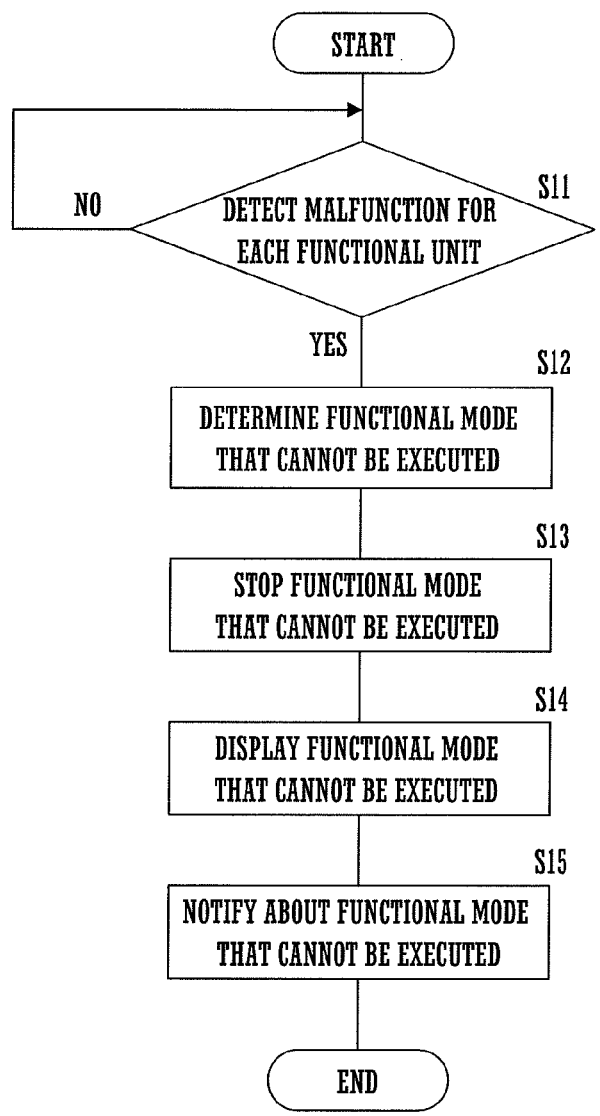
FIG. 5 is a flowchart illustrating the flow of the processing by an image forming apparatus when a malfunction occurs.

As illustrated in FIG. 5, the malfunction detection part 12 of the image forming apparatus 1A monitors each functional unit and detects the presence or not of a malfunction in each functional unit (S11), and outputs the occurrence of a malfunction in the image reading unit 112 to the determination part 13. The determination part 13 refers to the correspondence table illustrated in FIG. 3 and determines that the functional modes that cannot be executed are the scan mode, the copy mode and the fax transmission mode (S12), and outputs a result of the determination to the control part 14.

The control part 14 stops the image reading unit 112 that operates only when the scan mode, the copy mode and the fax transmission mode are executed (S13).

Figure 7A:
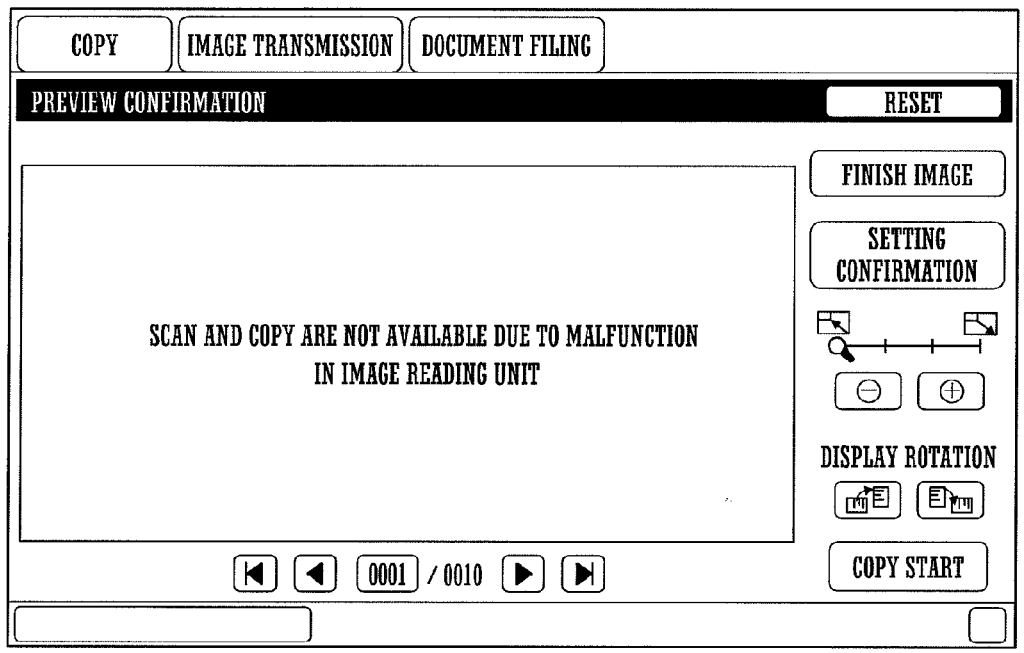
FIG. 7A exemplifies an error message displayed on a display unit of an image forming apparatus.
Figure 7B:
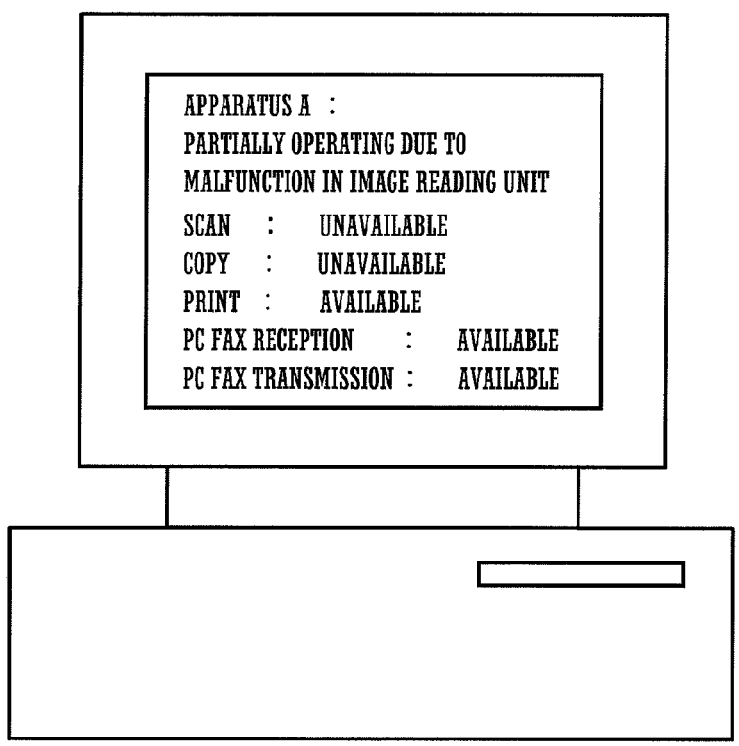
FIG. 7B exemplifies an error message displayed on a personal computer.

The control part 14 makes the display unit 111 display an error message illustrated in FIG. 7A (S14). Such an error message may be displayed not only on the display unit 111 but also on each PC 3A to 3C as illustrated in FIG. 7B. The control part 14 transmits the scan mode, the copy mode and the fax transmission mode to the management apparatus 2 via the communication part 15 (S15).

Figure 6:
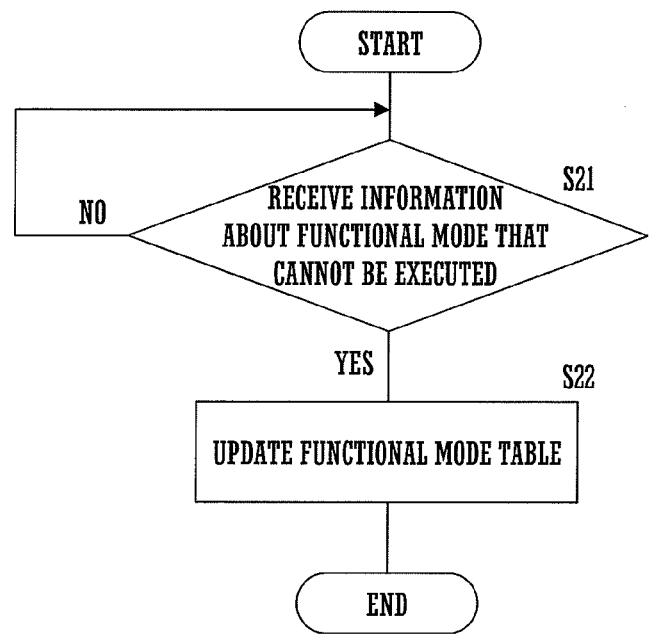
FIG. 6 is a flowchart illustrating the flow of the processing by the management apparatus when a malfunction occurs.

As illustrated in FIG. 6, when receiving the scan mode, the copy mode and the fax transmission mode as functional modes that cannot be executed from the image forming apparatus 1A via the communication control part 22 (S21), the control part 23 of the management apparatus 2 updates the functional mode table 211 (S22). The control part 23 disables the scan mode, the copy mode and the fax transmission mode of the image forming apparatus 1A, and increases priorities for the print mode and the fax reception mode that the image forming apparatus 1A can execute. Along with this, the control part 23 decreases priorities for the print mode and the fax reception mode of the normally operative image forming apparatuses 1B and 1C. As a result, the control part 23 updates the functional mode table 211 from the state illustrated in FIG. 4A to the state illustrated in FIG. 4B.

As stated above, when receiving the scan mode, the copy mode and the fax transmission mode as functional modes that cannot be executed from the image forming apparatus 1A, the management apparatus 2 increases priorities for the print mode and the fax reception mode of the image forming apparatus 1A and decreases priorities for the print mode and the fax reception mode of the image forming apparatuses 1B and 1C. Thereby, the management apparatus 2 can allocate to the image forming apparatus 1A a job in an executable functional mode, so that a load on the image forming apparatuses 1B and 1C can be reduced. As a result, when directly accepting an operation and an input by a user concerning a job in the scan mode, the copy mode or the fax transmission mode, the image forming apparatuses 1B and 1C can reduce waiting time for the job, and therefore can improve user's convenience.

Figure 8:
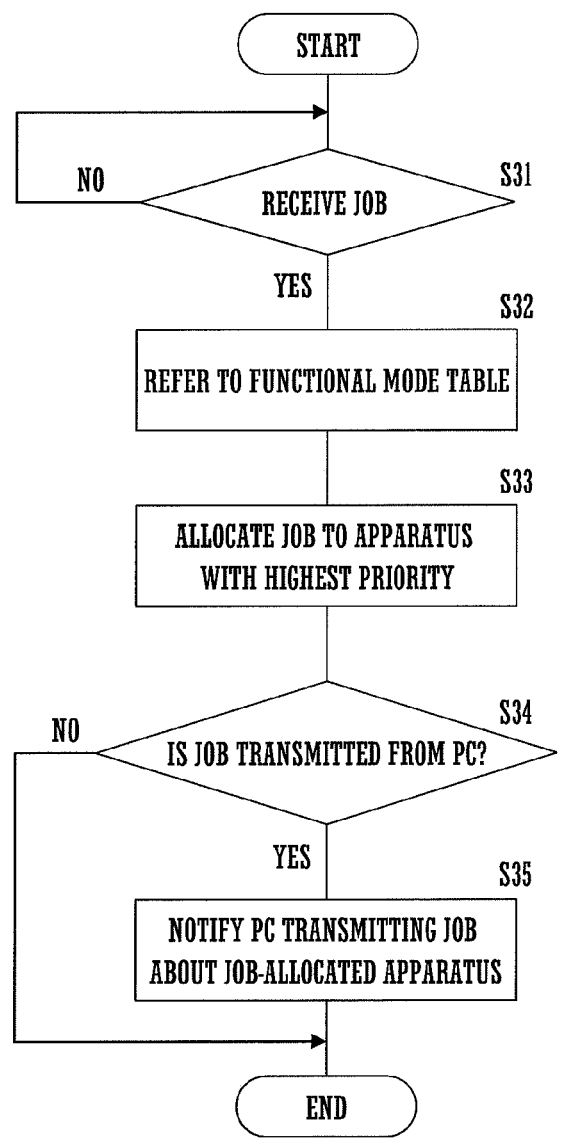
FIG. 8 is a flowchart illustrating the flow of the processing of job allocation by the management apparatus.

The following describes examples of receiving a request for execution of a job. Referring first to FIG. 8, the case of the management apparatus 2 receiving a request for execution of a job in a print mode from the PC 3A is described below.

As illustrated in FIG. 8, when receiving a request for execution of a job in a print mode from the PC 3A via the communication control part 22 (S31), the control part 23 of the management apparatus 2 refers to the functional mode table 211 (S32). The control part 23 allocates the job to the image forming apparatus 1A with the highest priority (S33).

Since the request for the job is issued from the PC 3A (S34), the control part 23 notifies the PC 3A of the image forming apparatus 1A to which the job is allocated (S35). The PC 3A displays on the display part 35 a message such as "the job is executed by image forming apparatus 1A" or "image forming apparatus 1A executes printing". Only when the request for the job is issued from a PC, the control part 23 notifies the PC of the image forming apparatus to which the job is allocated, and when the request is issued from an apparatus other than a PC (such as an image forming apparatus), the control part 23 does not make a notification.

As stated above, the management apparatus 2 can allocate the job to the appropriate image forming apparatus 1A simply by referring to the latest functional mode table 211. When receiving a request for execution of a job from the PC 3A, the management apparatus 2 notifies the PC 3A of the apparatus that will execute the job, whereby a user can be notified of the image forming apparatus 1A that will execute the job.

Figure 9:
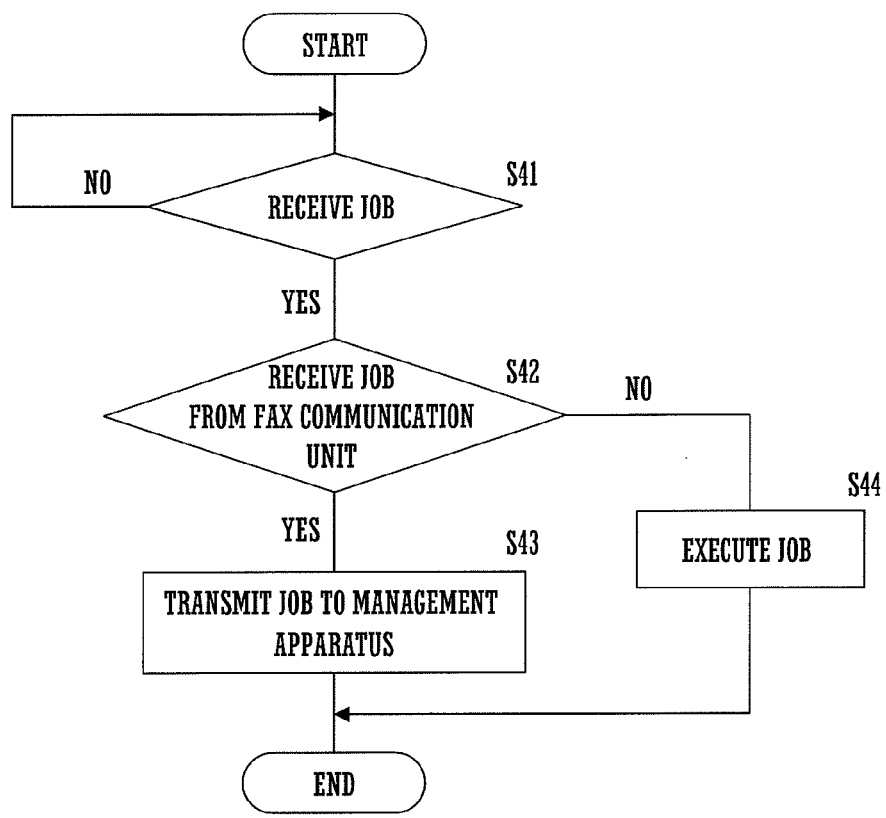
FIG. 9 is a flowchart illustrating the flow of the processing of job execution by an image forming apparatus.

Referring next to FIG. 9, the case of the image forming apparatus 1B receiving a job in the fax reception mode via the fax communication unit 115 is described below.

As illustrated in FIG. 9, the control part 14 of the image forming apparatus 1B receives a job (S41). Since the control part 14 receives the job (job in the fax reception mode) via the fax communication unit 115 (S42), the control part 14 transmits the received job to the management apparatus 2 (S43). As illustrated in FIG. 4B and FIG. 8, the management apparatus 2 refers to the functional mode table 211 and allocates the job in the fax reception mode to the image forming apparatus 1A. With this procedure, the job in the fax reception mode that the image forming apparatus 1B receives is preferentially allocated to the image forming apparatus 1A.

On the other hand, when receiving a job not via the fax communication unit 115, the control part 14 of the image forming apparatus 1B directly executes the received job (S44). Exemplary jobs received not via the fax communication unit 115 include a job allocated to the image forming apparatus 1B by the management apparatus 2 or a job (a job in the scan mode, the copy mode, or the fax transmission mode) accepted by the image forming apparatus 1B through an operation and an input by a user.

Referring next to FIG. 10, a functional mode table when a malfunction occurs in each functional unit is described below. In the table, a cross, a circle, a double-circle, and a triangle denote the same as in FIG. 4A and FIG. 4B. An asterisk denotes a function that is executable but is disabled. The following assumes the case where a malfunction occurs in a functional unit of the image forming apparatus 1A and the image forming apparatus 1B operates normally.

(A) When a Malfunction Occurs in the Display Unit 111

In this case, the image forming apparatus 1A cannot execute a job in a functional mode in response to a user's operation. The image forming apparatuses 1A and 1B have the same setting as to whether a job is executable or not and their priorities as in the case where a malfunction occurs in the image reading unit 112 (see FIG. 4B).

(B) When a Malfunction Occurs in the Sheet Conveyance Unit 113

In this case, since the image forming apparatus 1A cannot convey a sheet from a sheet storage part, jobs in the copy mode and in the print mode relating to print processing cannot be executed, but jobs in the scan mode and in the fax transmission mode can be executed (see FIG. 3). The image forming apparatus 1A can receive a job in the fax reception mode relating to print processing from another apparatus, but cannot perform printing. A job in the fax reception mode that the image forming apparatus 1A receives is printed by the image forming apparatus 1B.

A job in the copy mode or in the print mode is not allocated to the image forming apparatus 1A, but is allocated to the image forming apparatus 1B with a normal priority. A job in the fax reception mode is allocated while decreasing a priority for the job of the image forming apparatus 1A and increasing a priority for the job of the image forming apparatus 1B.

A job in the scan mode or in the fax transmission mode is allocated while decreasing a priority for the job of the image forming apparatus 1B and increasing a priority for the job of the image forming apparatus 1A. The image forming apparatus 1B does not directly accept a job in the scan mode or in the fax transmission mode through a user's operation and input, thus decreasing a priority for the job.

Thereby, the management apparatus 2 can preferentially allocate a job in an executable functional mode to the image forming apparatus 1A, whereby a load on the image forming apparatus 1B can be reduced.

Note here that as indicated in (B'), as for a job in the scan mode or in the fax transmission mode, the image forming apparatus 1A and the image forming apparatus 1B can directly accept a user's operation and input for such a job, and can make such a job executable. In this case, the job in the scan mode or in the fax transmission mode is allocated to the image forming apparatus 1A or 1B with a normal priority. Thereby, the number of apparatuses that directly accept a job in the scan mode or in the fax transmission mode through a user's operation and input can be increased. As a result, waiting time for a job in the scan mode or in the fax transmission mode can be reduced, and user's convenience can be improved.

(C) When a Malfunction Occurs in the Image Formation Unit 114

In this case, since print processing cannot be performed, the image forming apparatuses 1A and 1B have the same setting as to whether a job is executable or not and their priorities as in the case where a malfunction occurs in the sheet conveyance unit 113. As indicated in (C'), as for a job in the scan mode or in the fax transmission mode, the image forming apparatus 1A and the image forming apparatus 1B can directly accept a user's operation and input for such a job, and can make such a job executable.

(D) When a Malfunction Occurs in the Fax Communication Unit 115

In this case, since the image forming apparatus 1A cannot execute a functional mode relating to fax communication, jobs in the fax reception mode and in the fax transmission mode cannot be executed, but jobs in the scan mode, in the copy mode and in the print mode can be executed (see FIG. 3).

A job in the fax reception mode or in the fax transmission mode is not allocated to the image forming apparatus 1A, but is allocated to the image forming apparatus 1B with a normal priority.

A job in the scan mode, in the print mode or in the copy mode is allocated while decreasing a priority for the job of the image forming apparatus 1B and increasing a priority for the job of the image forming apparatus 1A. Thereby, the management apparatus 2 can preferentially allocate a job in an executable functional mode to the image forming apparatus 1A, whereby a load on the image forming apparatus 1B can be reduced.

As indicated in (D'), if the usage frequency of the fax communication unit 115 is lower than other functional units, a job in the other functional modes may be allocated to the image forming apparatuses 1A and 1B with a normal priority.

As for a job in the scan mode or in the copy mode, the image forming apparatus 1A and the image forming apparatus 1B can directly accept a user's operation and input for such a job, and can make such a job executable. In this case, the job in the scan mode or in the copy mode is allocated to the image forming apparatus 1A or 1B with a normal priority. Thereby, the number of apparatuses that directly accept a job in the scan mode or in the copy mode through a user's operation and input can be increased. As a result, waiting time for a job in the scan mode or in the copy mode can be reduced, and user's convenience can be improved.

In the above embodiment, the determination part 13 of each image forming apparatus 1 determines a functional mode that cannot be executed based on the defective functional unit, and notifies the management apparatus 2 of the functional mode that cannot be executed as a generation state of malfunctions. Instead, each image forming apparatus 1 may notify the management apparatus 2 of the defective functional unit as the generation state of malfunctions. In this case, the management apparatus 2 may be provided with a determination part 13, and may make a determination on the functional mode that cannot be executed based on the defective functional unit.

In the above embodiment, if there are a plurality of image forming apparatuses with the same priority at S33 of FIG. 8, the control part 23 of the management apparatus 2 may allocate a job to the image forming apparatus located closest to the PC that issues a request for the job. In this case, the control part 23 may store a distance between each PC 3A to 3C and each image forming apparatus 1A to 1C in the storage part 21. Alternatively, the control part 23 may allocate a job based on the number of jobs in a standby state in the image forming apparatuses 1A to 1C. In this case, the control part 23 may monitor the execution statuses of jobs in the image forming apparatuses 1A to 1C or when the number of jobs in a standby state in the image forming apparatus 1A to 1C falls below a predetermined number, the control part 23 may allocate a new job to the image forming apparatus.

In the above embodiments, as indicated in (D) of FIG. 10, when a malfunction occurs in the fax communication unit 115, the fax transmission mode is disabled. However, even when a malfunction occurs in the fax communication unit 115, the scan function is available. The image forming apparatus 1A generating a malfunction in the fax communication unit 115 can generate image data by scanning a document, and makes the fax communication unit 115 of the image forming apparatus 1B as another image forming apparatus fax-transmit the image data. In this case, the image forming apparatus 1A scans a document to generate image data, and transmits the image data to the management apparatus 2. The management apparatus 2 allocates such a job to the image forming apparatus 1B as a job in the fax transmission mode. Thereby, the number of apparatuses that directly accept a job in the fax transmission mode can be increased. As a result, waiting time for a job in the fax transmission mode can be reduced, and user's convenience can be improved.

The above embodiment exemplifies the image forming apparatuses 1A to 1C as multifunctional machines. However, not only such image forming apparatuses 1A to 1C but also a single-function machine such as a facsimile or a printer may be connected to the management apparatus 2. In this case, a job is allocated to the facsimile with the same priority as in an image forming apparatus that can execute a job in the fax reception mode and in the fax transmission mode only. A job is allocated to the printer with the same priority as in an image forming apparatus that can execute a job in the print mode only.

The above described embodiments are to be considered in all respects as illustrative and not restrictive. The scope of the invention is indicated by the appended claims rather than by the foregoing description. All changes which come within the meaning and range of equivalency of the claims are intended to be embraced therein.

What is claimed is:

1. A management apparatus connected to a plurality of image processing apparatuses that execute jobs corresponding to a plurality of functional modes relating to image processing and accepting a request for execution of the jobs from an information processing apparatus, the management apparatus comprising:

storage means that stores a functional mode table that stores a relationship between a plurality of functional modes and a generation state of a malfunction in the plurality of functional modes per each of the plurality of image processing apparatuses; and allocation means that refers to the functional mode table and when a functional mode of a job accepted from the information processing apparatus agrees with a normal-state functional mode that a defective image processing apparatus generating a malfunction can execute by using a functional unit free from a malfunction, the defective image processing apparatus having an error-state functional mode which cannot be executed by a functional unit which generates a malfunction, allocates the job to the defective image processing apparatus.

2. The management apparatus according to claim 1, further comprising:

reception means that receives a generation state of a malfunction from the image processing apparatuses; and update means that updates the functional mode table when the reception means receives a generation state of a malfunction, wherein the functional mode table stores a relationship between the plurality of functional modes and priorities of the image processing apparatuses for allocation of a job, the update means increases a priority of an image processing apparatus with less normal-state functional modes for allocation of jobs corresponding to the normal-state functional modes, and the allocation means refers to the functional mode table to allocate a job accepted from the information processing apparatus to one of the image processing apparatus.

3. The management apparatus according to claim 1, further comprising job-allocated apparatus notification means that notifies the information processing apparatus that issues a request for execution of a job about an image processing apparatus to which the job is allocated.

4. The management apparatus according to claim 2, further comprising job-allocated apparatus notification means that notifies the information processing apparatus that issues a request for execution of a job about an image processing apparatus to which the job is allocated.

5. An image processing apparatus that executes jobs corresponding to a plurality of functional modes relating to image processing, to which a job corresponding to a normal-state functional mode that can be executed by using a functional unit free from a malfunction during a malfunction generated in the image processing apparatus is preferentially allocated by a management apparatus, the image processing apparatus having an error-state function mode which cannot be executed by a functional unit which generates a malfunction, the image processing apparatus comprising:

a plurality of functional units, each operating with execution of at least one of the plurality of functional modes;

detection means that detects a malfunction for each of the plurality of functional units; and notification means that notifies the management apparatus about a generation state of a malfunction in the plurality of functional modes based on a detection result by the detection means.

6. The image processing apparatus according to claim 5, further comprising a display part that displays, based on a detection result by the detection means, an error-state functional mode that cannot be executed among the plurality of functional modes.

* * * * *